United States Patent [19]

Sole

[11] 4,427,942
[45] Jan. 24, 1984

[54] CONCEALED ELECTRICAL CONDUCTOR DETECTING SYSTEM

[75] Inventor: Lloyd H. Sole, Bristol, England

[73] Assignee: Electrolocation Limited, Bristol, England

[21] Appl. No.: 256,232

[22] Filed: Apr. 21, 1981

[30] Foreign Application Priority Data

Apr. 29, 1980 [GB] United Kingdom ............... 8014094

[51] Int. Cl.³ ............................................. G01V 3/11
[52] U.S. Cl. ...................................... 324/326; 324/67
[58] Field of Search .............. 324/326, 329, 67, 207, 324/208, 242, 243

[56] References Cited

U.S. PATENT DOCUMENTS

| | | | |
|---|---|---|---|
| 3,471,772 | 10/1969 | Smith | 324/329 |
| 4,091,322 | 5/1978 | Stankoff | 324/329 |
| 4,220,913 | 9/1980 | Howell et al. | 324/326 X |
| 4,295,095 | 10/1981 | Thomas et al. | 324/326 |

FOREIGN PATENT DOCUMENTS 2041531 10/1980 United Kingdom .

Primary Examiner—Gerard R. Strecker
Attorney, Agent, or Firm—Young & Thompson

[57] ABSTRACT

An underground electromagnetic radiating source is detected by two coils (1, 2) one over the other. To avoid false readings due to air borne signals, their outputs are compared (13) and only if the lower coil output is a predetermined amount greater than that of the upper coil is an audio indicator (21) activated. Automatic gain control (9) is applied to both coil outputs, to limit the gain whenever either output threatens saturation.

8 Claims, 1 Drawing Figure

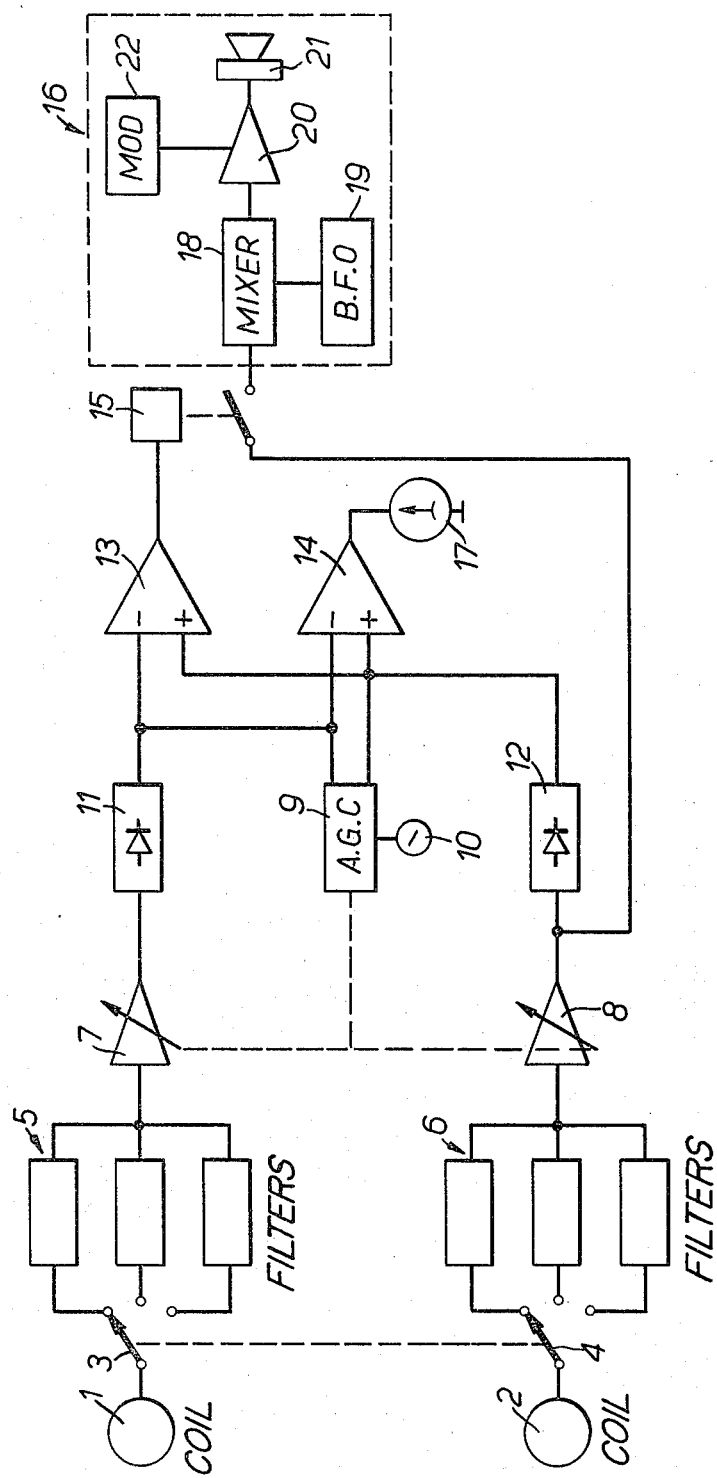

CONCEALED ELECTRICAL CONDUCTOR DETECTING SYSTEM

This invention relates to surveying instruments. It is concerned with the detection of elements such as buried cables or pipelines which carry, or can be made to carry, an electric current generating an electromagnetic field.

Many techniques are known, but we have been favouring the use of two parallel, vertically spaced coils whose outputs can be compared and processed to give very accurate positioning over a concealed conductor, and furthermore to give a direct reading of the depth of that conductor below the surface.

However, there can be a problem with stray signals, particularly those above ground generated for example by overhead power cables or by R.F. transmissions. Airborne radio waves in the low frequency range, say 11 to 50 KHz, are virtually ever-present around the earth's surface and they have ground-carried counterparts originating at the transmitters. These have an affinity for underground conductive objects such as cables and metallic pipelines, and so induce R.F. currents in them, which in turn generate the signals which these instruments are primarily designed to detect. However, an airborne signal of the same frequency will tend to swamp the ground signal, and a single coil detector with no means of discrimination is generally useless. With two coils, measures can be taken to suppress the effect of the airborne signals, and it is the aim of the invention to achieve this.

According to the present invention there is provided a detection system for concealed current carrying conductors such as underground pipes or cables, wherein the outputs of two parallel, spaced first and second coils are directed through respective first and second channels to a comparator, and wherein an output to an indicator from the first coil is enabled by the comparator only when the signal strength in the first coil is greater by a predetermined amount than that in the second coil.

Thus, for underground detection an indicated output will only occur when the first or lower coil is closer to the conductor than the second or upper coil and is receiving a stronger signal. Generally, airborne signals will have about an equal effect on both coils, and so will effectively cancel out, but if there is one of sufficient power to affect the upper coil more than the lower one, the system will be disabled.

Preferably the outputs of the coils are applied to common gain control means for both channels to limit the gain when the signal strength in one or other channel attains a given level.

The predetermined amount referred to above may be zero, or a finite excess may be required for the enablement. The gain control means, which are activated when either channel is near limit, ensure that there is no saturation from the signals, and thus no possibility of it being impossible to distinguish if there is a difference in strength.

The system will preferably be provided with filters at the outputs of the coils, and various indicators are feasible, both visual and audible.

For a better understanding of the invention one embodiment will now be described, by way of example, with reference to the accompanying drawing in which the single FIGURE is a block circuit diagram of a detection system for hidden conductors.

Top and bottom coils 1 and 2 are arranged with their axes parallel and spaced apart, and in use the bottom coil will be directly below the top one. Their outputs are directed to top and bottom signal channels having respective ganged switches 3 and 4 for selecting from similar banks of filters 5 and 6. The filtered outputs are fed to respective matched amplifiers 7 and 8, both subject to a common DC gain control from an automatic gain control circuit 9, which has a manual adjustment 10. The amplifier outputs are directed to similar full wave averaging rectifiers 11 and 12. The top channel signal is applied to the negative inputs of a comparator 13 and a differential amplifier 14, while the bottom channel signal is applied to the positive inputs of those two circuits. The top and bottom channel signals are also applied to the automatic gain control 9, and whenever one of the signals approaches the rectifier limit, the gain is reduced.

The comparator governs an electronic switch 15 which, if the bottom channel has a larger signal than the top channel, admits the amplified but unrectified bottom channel signal to indicator means 16. The actual difference between the rectified channel signals is shown on a centre-zeroing meter 17 at the output of differential amplifier 14. Elements 14 and 17 are optional.

The indicator means includes a mixer 18 which receives the unrectified bottom channel signal and a beat frequency from oscillator 19, the output being an audio frequency which is amplified in 20 and then applied to loudspeaker 21. This is used when the coil signals are beyond audio range. When they are audible frequency signals, the beat frequency is not necessary, and the bottom channel signal can simply be improved for audibility by modulator 22. The selection of these elements of the indicating means can be tied to the switches 3 and 4 which select the appropriate filters.

It has been found that the automatic gain control gives rise to an extremely well-defined sharp peak at the point of traverse of an underground conductor. As the gain is reduced by control 10 so this response can be improved, until the conductor can be almost literally pinpointed. The arrangement has good directional properties and there is no chance of misreading due to a high signal in the top coil 1.

The rectifier limiting problem can also be overcome by allowing the top channel to limit at a lower level than the bottom, thus always producing a difference.

I claim:

1. A detection system for concealed current carrying conductors such as underground pipes or cables, comprising two parallel, spaced first and second coils, respective first and second channels through which the coil outputs are directed, a comparator receiving said coil outputs via said channels to produce its own output corresponding the difference in the coil outputs, an indicator, a further channel from the first coil to the indicator, and gating means in said further channel responsive to the comparator output to pass the first coil output to the indicator only when the signal strength in the first coil is greater by a predetermined amount than that in the second coil.

2. A detection system as claimed in claim 1, including common gain control means for both first and second channels responsive to the coil outputs to limit the gain when the signal strength in the first or second channel attains a given level.

3. A detection system as claimed in claim 2, wherein the gain control means is automatic, with facility for manual adjustment, and wherein matched variable amplifiers in the respective first and second channels are arranged to respond to the control.

4. A detection system as claimed in claim 3, wherein the first and second channels include full wave averaging rectifiers which receive the amplifier outputs, the rectifier outputs being to the gain control means and the comparator.

5. A detection system as claimed in claim 1, wherein the channels have matched filters with a common selector.

6. A detection system as claimed in claim 1, wherein the indicator is an audio indicator.

7. A detection system as claimed in claim 5, wherein there are means associated with the indicator for modulating the first coil signal, the modulation being linked to the selected filters.

8. A detection system as claimed in claim 1, wherein a differential amplifier receives the outputs of the two channels and a visual display is arranged to indicate the signal difference detected thereby.

* * * * *